US005435050A

United States Patent [19]

Alt

[11] Patent Number: 5,435,050

[45] Date of Patent: Jul. 25, 1995

[54] CRUSHING MACHINE, PARTICULARLY IMPACT CRUSHER

[75] Inventor: Günter Alt, Kleinblittersdorf, Germany

[73] Assignee: Krupp Fordertechnik GmbH, Duisburg, Germany

[21] Appl. No.: 150,186

[22] PCT Filed: Mar. 15, 1993

[86] PCT No.: PCT/EP93/00591

§ 371 Date: Nov. 29, 1993

§ 102(e) Date: Nov. 29, 1993

[87] PCT Pub. No.: WO93/19847

PCT Pub. Date: Oct. 14, 1993

[30] Foreign Application Priority Data

Apr. 1, 1992 [DE] Germany ........................ 42 10 809.8

[51] Int. Cl.[6] ......................... B23P 6/00; B02C 13/26

[52] U.S. Cl. ............................... 29/402.03; 241/189.1; 241/285.1; 241/285.3

[58] Field of Search .................. 241/189.1, 189.2, 190, 241/285.2, 285.3, 285.1; 29/402.03, 402.01

[56] References Cited

U.S. PATENT DOCUMENTS

| | | | |
|---|---|---|---|
| 2,554,071 | 5/1951 | Strawn | 241/285.2 |
| 4,202,503 | 5/1980 | Parkinson et al. | 241/285.3 X |
| 4,449,673 | 5/1984 | Cameron | 241/285.3 X |
| 4,706,898 | 11/1987 | Schönfeld et al. | 241/285.3 X |
| 5,213,273 | 5/1993 | Linners | 241/285.3 X |
| 5,273,218 | 12/1993 | Burns | 241/285.3 X |

*Primary Examiner*—Timothy V. Eley
*Attorney, Agent, or Firm*—Herbert Dubno

[57] ABSTRACT

Proposed is a crushing machine, in particular an impact crusher, comprising at least one rotatably driven rotor mounted in a housing and equipped with crushing elements, as well as at least one impact mechanism which faces the rotor and is fitted with impact elements, wherein the impact mechanism or impact mechanisms is or are mounted in at least one frame which is independent of the housing, and which together with the impact mechanism or mechanisms can be swung into a roughly horizontal position outside the housing.

17 Claims, 6 Drawing Sheets

CRUSHING MACHINE, PARTICULARLY IMPACT CRUSHER

CROSS REFERENCE TO RELATED APPLICATIONS

This application is a national phase of PCT/EP93/00591 filed 15 Mar. 1993 and based, in turn, on German national application P4210809.8 of 1 Apr. 1992 under the International Convention.

FIELD OF THE INVENTION

The present invention relates to a crushing machine and, more particularly, to an impact crusher, comprising at least one rotatably driven rotor mounted in a housing and equipped with crushing elements, as well as at least one impact mechanism which faces the rotor and is fitted with impact elements.

BACKGROUND OF THE INVENTION

German patents nos. DE-A 25 16 014 and DE-A 39 39 598 describe a crushing machine, in particular an impact crusher, which comprises a rotor equipped with crushing elements, wherein inside the housing at least one impact mechanism fitted with impact elements is mounted. In order to replace the impact elements, at least part of the housing can be swung around a horizontal axis. A disadvantage of such an apparatus is that it is difficult or impossible to loosen from the outside the impact elements in the area of the impact mechanisms. Moreover problems are encountered with respect to removing the impact elements from the inside of the machine. The same also applies, of course, to the subsequent re-fitting of the impact mechanisms in the reverse mode of operation.

OBJECTS OF THE INVENTION

It is the object of the invention to provide an improved crushing machine so that the impact elements can be replaced without difficulty and so as to ensure, during the replacing of the impact elements, the safety of the operator by reducing possible accident risk.

Another object is to make it possible to replace the impact elements more quickly and, therefore, more cost effectively compared to the state of the art, and in this way considerable reduce the down time of the crushing machine.

Finally, it is an object to improve the accessibility of the components in the area of the impact mechanism and to simplify the work involved in replacing the impact elements.

SUMMARY OF THE INVENTION

These objects are achieved according to the invention in that the impact mechanism or mechanisms is or are mounted in at least one frame which is independent of the housing, and which together with the impact mechanism or mechanisms can be swung into a position outside the housing.

The frame or frames can be swung about a horizontal axis, whereby the impact mechanism or mechanisms can be moved into a roughly horizontal position. The frame can be formed by lateral rocker arm parts, between which the respective impact mechanism is mounted on at least one side.

The frame can be divided into an upper rocker arm part and a lower rocker arm part, the upper part receiving the respective impact mechanism and the lower part being swingable with respect to the housing. In a retracted position the upper part of the rocker arms can dip the housing together with the respective impact mechanism, while the lower part of the rocker arms remains outside the housing.

The rocker arm parts can form at the same time at least one section of the rear wall. The rear wall can be formed by at least one removable and/or swingable flap, which can be joined to the housing.

The machine can have an upper, as well as a lower flap assigned to the respective rocker arm part whereby the upper flap is swingable and the lower flap is removable.

According to a feature of the invention, a wall section is provided between the two flaps which interconnects the two rocker arm parts. The wall section can receive at least one adjusting device for the respective impact mechanism. In the retracted position the impact mechanism at least of the upper part of the respective rocker arm can be locked in place with respect to the respective housing part, particularly by bolts.

A further section of the rear wall can be provided with impact elements facing the rotor, whereby this section can be swung into a position outside the housing, independently from the housing, or the impact mechanism mechanisms. The further section can be swingable about a horizontal axis provided at its lower end and can be swung into a roughly horizontal position.

At least one adjusting device, particularly a hydraulic cylinder is provided for swinging the rocker arm parts on the one hand, and the further section. A single cylinder can be supported on the housing at one side and can have a free end on the other side which can be selectively fastened to a coupling point of the lower rocker arm part or to a coupling point of the further section. The lower part of each rocker arm is provided with throughgoing bores. The lateral part of the further section running parallel thereto can have a recess whereby the bore and the recess are opposite to each other when the impact mechanism is outside the housing so that it is possible to lock by means of a securing element the respective rocker arm-part with the further part.

The bolts arresting the upper rocker arm part with respect to the housing in the retracted position of the impact mechanism form at the same time the securing element.

With regard to the method, the securing means of the impact mechanism or housing part in question to the housing is removed and the impact mechanism or housing part is swung into a position outside the housing and there is secured again. The impact elements/bodies are then replaced or turned, following which the securing means is released and the impact mechanism or the housing part is swung back into its starting position and again secured to the housing.

Because of the suspension of the impact mechanism or mechanisms independently from the housing inside the frame, which is in the form of rocker arms and at the same time forms part of the rear wall, the replacing of the impact elements or impact bodies can take place without problem outside the housing, and can be carried out roughly in a horizontal position of the impact elements or impact bodies. Due to the fact that the impact elements or impact bodies that must be replaced are no longer positioned inside the housing but outside same, the accident risk during the replacing thereof is greatly reduced, the more so as no one need enter the housing to remove and re-install the relatively heavy impact elements or impact bodies.

The rocker arm is preferably divided into an upper as well as a lower part, wherein the upper part holds the impact mechanism and the lower part can swing around a horizontal axis in relation to the housing. With regard to the rear wall section, the swinging operation takes place in such a way that the lower part of the wall section can be swung around an also horizontally extending axis. This swinging movement can be brought about by at least one adjusting device, in particular a hydraulic cylinder, the one side of which engages a coupling point of the rocker arm or a coupling point of the rear wall section, or on the other hand, can be fixed optionally to the one or the other coupling point by means of a change-over cylinder. The choice of the adjusting device and its construction will depend on the application in question.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
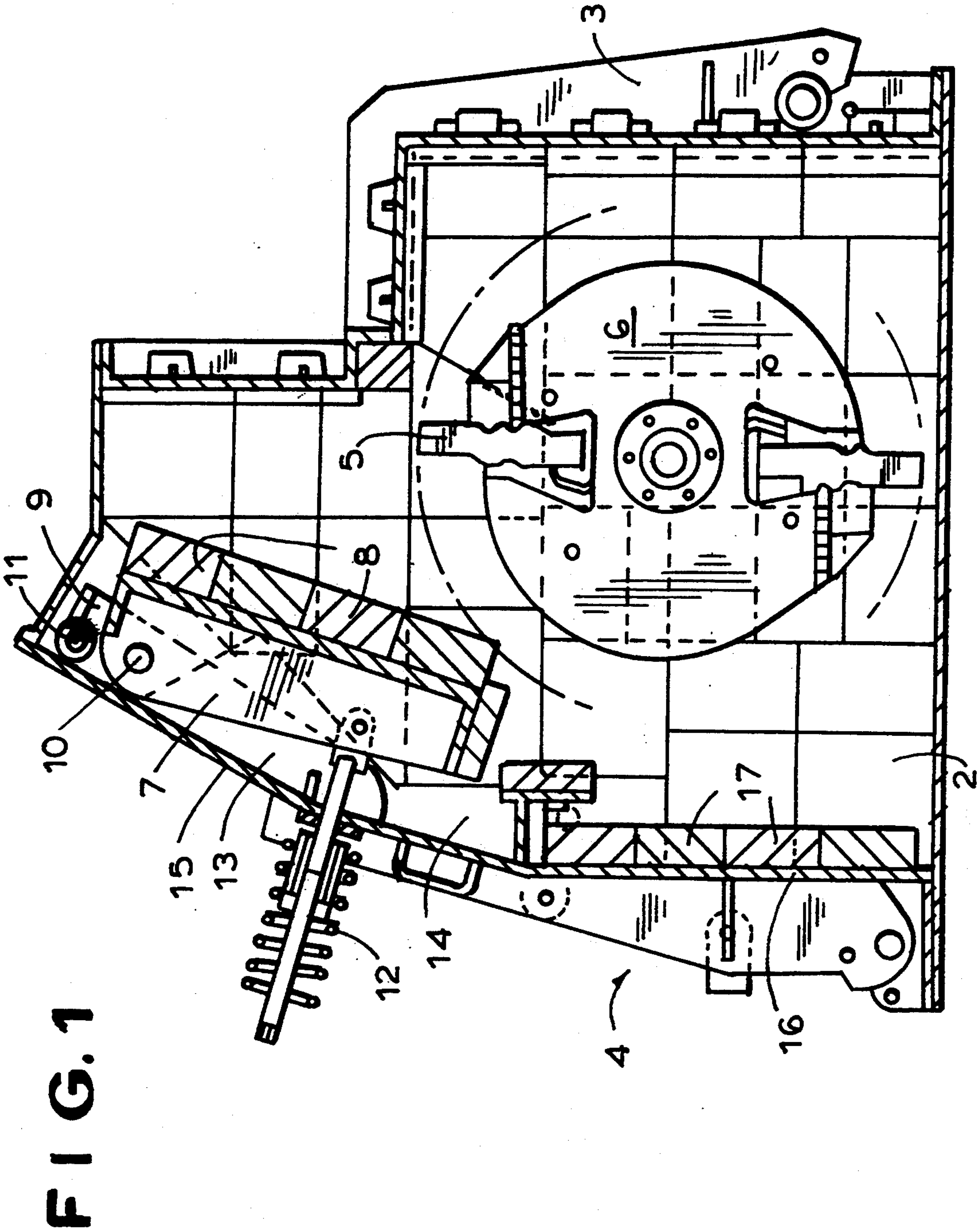
FIG. 1 is a section through an impact crusher with an impact mechanism.

The crushing machine in the form of the impact crusher 1 illustrated in FIG. 1 comprises a housing 2, a front housing section 3 rear housing section 4. Mounted rotatably driven inside the housing 2 is a rotor 6 equipped with crushing elements 5. Provided facing the rotor 6 is an impact mechanism 7 which comprises a plurality of impact elements 8. The impact crusher 1 according to FIG. 1 is shown in the closed position. The impact mechanism 7 is suspended inside a frame 9 swinging around a horizontal axis 10, the frame 9 being secured to the housing 2 by a bolt 11. Also provided in the rear part 4 of the impact crusher 1 is an adjusting device 12 for the impact mechanism 7, by means of which the impact mechanism 7 and accordingly the impact elements 8 can be adjusted in the direction of the crushing elements. The frame 9 comprises an upper rocker arm part 13 as well as a lower rocker arm part 14, the frame 9 at the same time forming part of the rear wall 15. Another part 16 of the rear housing section 4 is also provided with impact elements 17.

Figure 2:
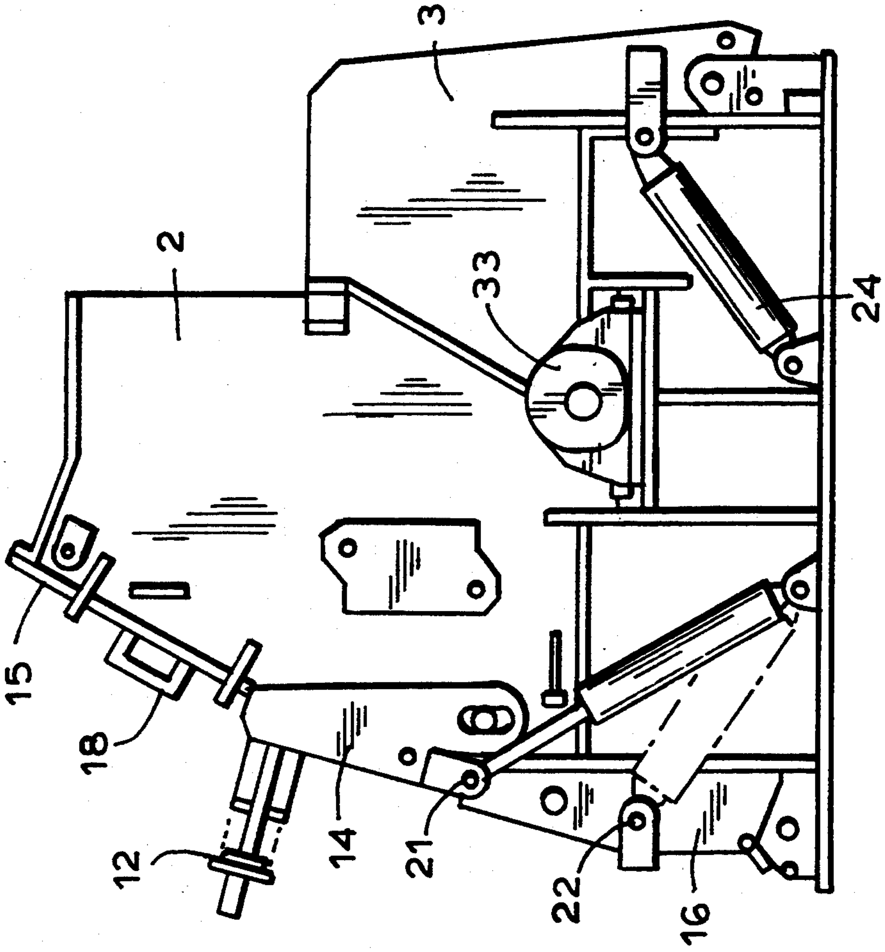
FIG. 2 is a diagrammatic representation of the impact crusher from the outside according to FIG. 1.

FIG. 2 shows in a diagrammatic representation the impact crusher 1 from the outside. One can note the housing 2, the lower rocker arm part 14, the rear wall 15, which in this case is formed by a swing flap with a handle 18. Also illustrated is the adjusting device 12, as well as an adjusting device which in this example has the form of a hydraulic cylinder 19, the one end of which is located in the bottom part 20 of the housing 2, and the free end of which can be fixed optionally to a coupling point 21 of the lower rocker arm part 14 or to a coupling point 22 of the other part 16. The drive shaft 23 of the rotor 6 illustrated in FIG. 1 is indicated in FIG. 2. Provided on the housing 2 is a further hydraulic cylinder 24, which can actuate the front housing section 3 in the opening direction.

Figure 3:
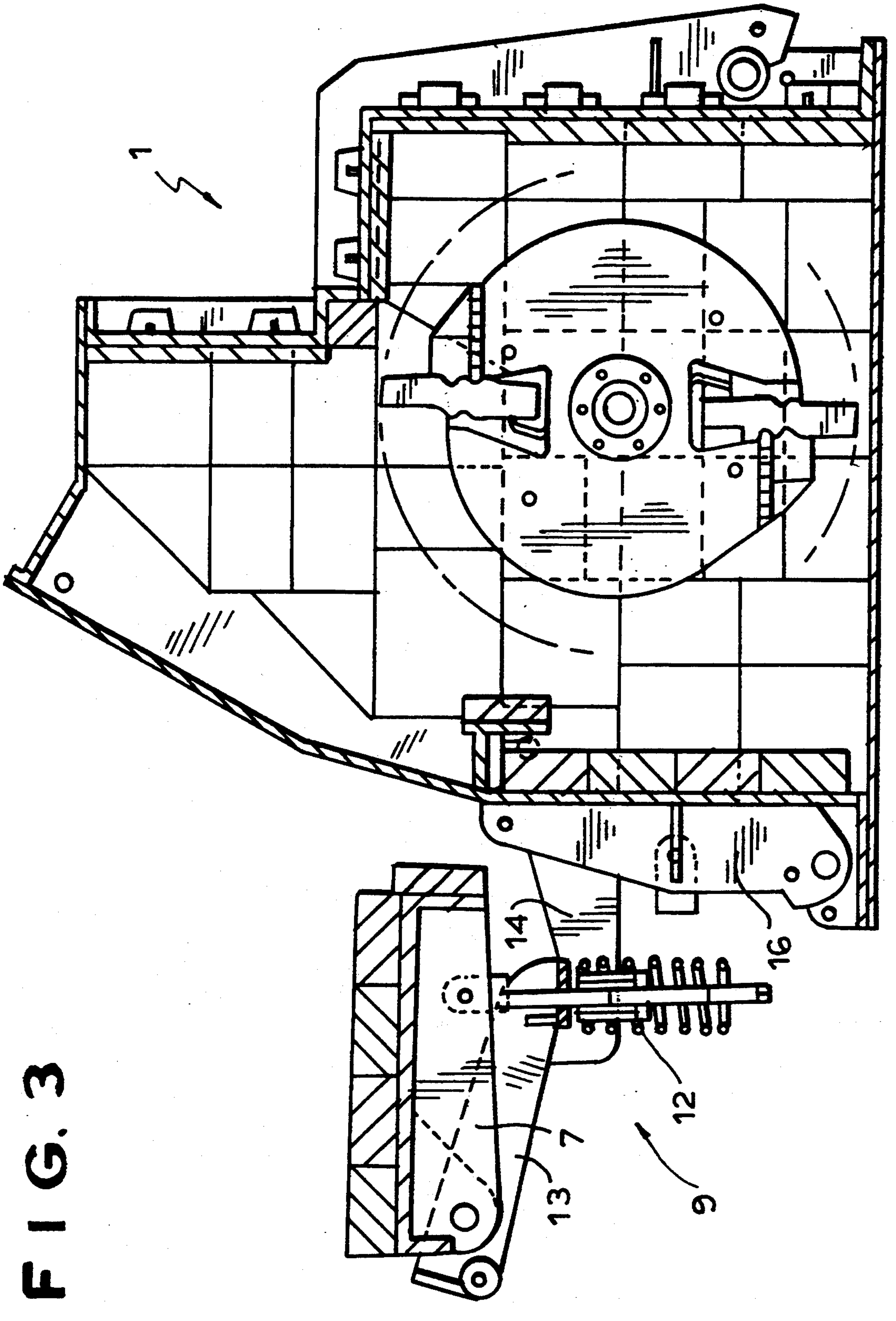
FIG. 3 is a section through an impact crusher with an impact mechanism according to FIG. 1 in the partially open position.

FIG. 3 shows the impact crusher 1 according to FIG. 1 in a partially open position. And also here, for the sake of simplicity, one can note the frame 9 and its upper rocker arm part 13 and the lower rocker arm part 14 together with the impact mechanism 7 as well as the adjusting device 12. In this example the other part 16 is still closed. The upper part of part 16 has a recess 25 which, when the impact mechanism 7 has been moved out, lies opposite a through-bore—not illustrated here—in the lower rocker arm part 14. The bolt 11 indicated in FIG. 1 can be put into this through-bore to secure the rocker arm part 14 to the bottom part 16.

Figure 4:
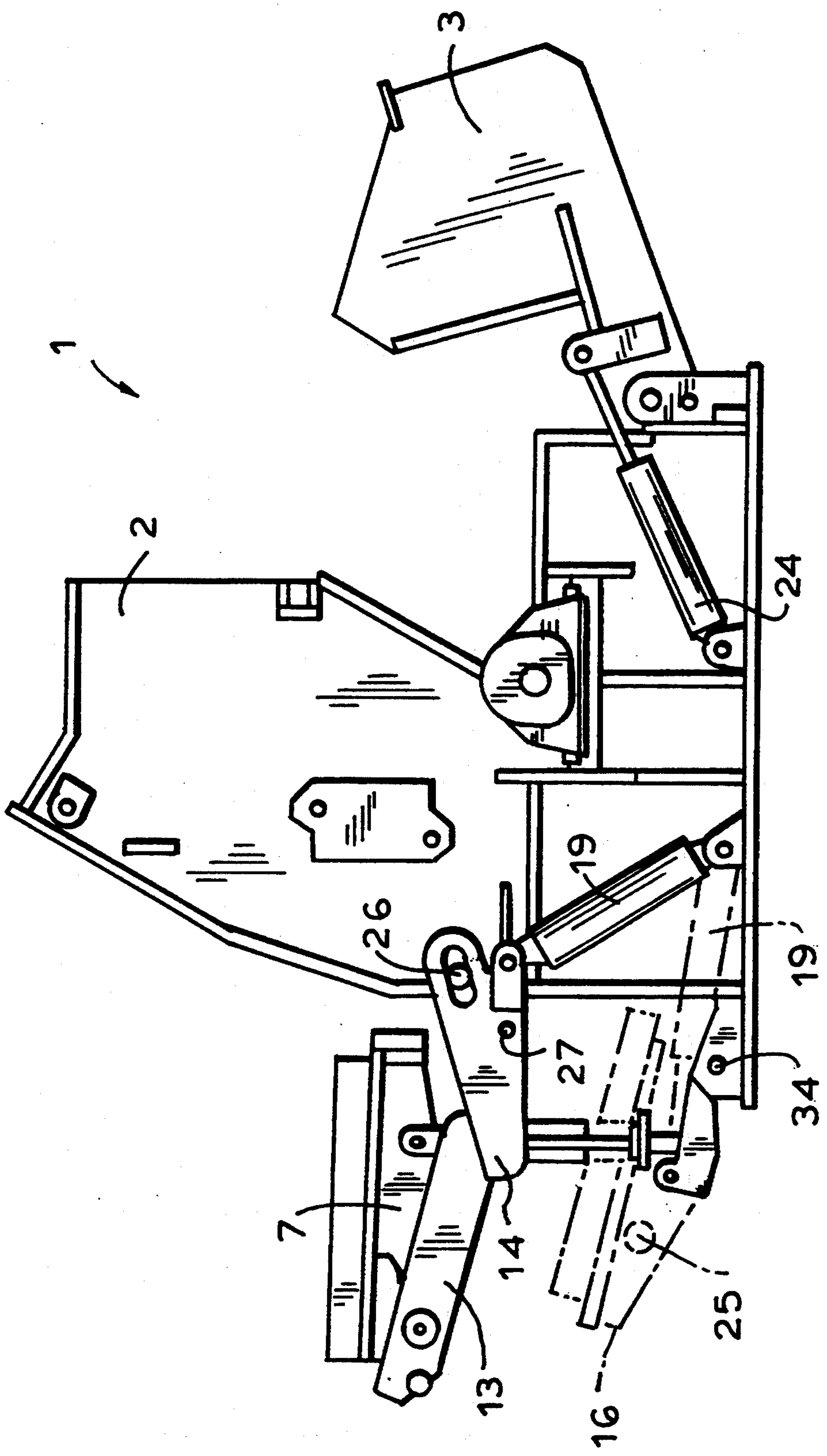
FIG. 4 is a diagrammatic representation of the impact crusher from the outside according to FIG. 3 in the completely open position.

FIG. 4 shows in diagrammatic representation the impact crusher 1 according to FIG. 3, but this time in the completely open position. Again illustrated are the upper rocker arm part 13 carrying the impact mechanism 7, as well as the lower rocker arm part 14 that can be swung around a horizontal axis 26, the swinging movement being brought about by means of the hydraulic cylinder 19 illustrated in FIG. 2. Also illustrated in broken lines is the swung out part 16 of the rear housing section 4 which in this example can be swung by the same hydraulic cylinder 19 around the swinging axis 34 relative to the impact mechanism 7 into a roughly horizontal position outside the housing 2. Indicated in this Figure is on the one hand the through-bore 27 in the lower rocker arm part 14, which when the bottom part 16 is moved in lies opposite the illustrated recess 25. The front housing section 3 is moved into the illustrated open position-by the hydraulic cylinder 24.

Figure 5A:
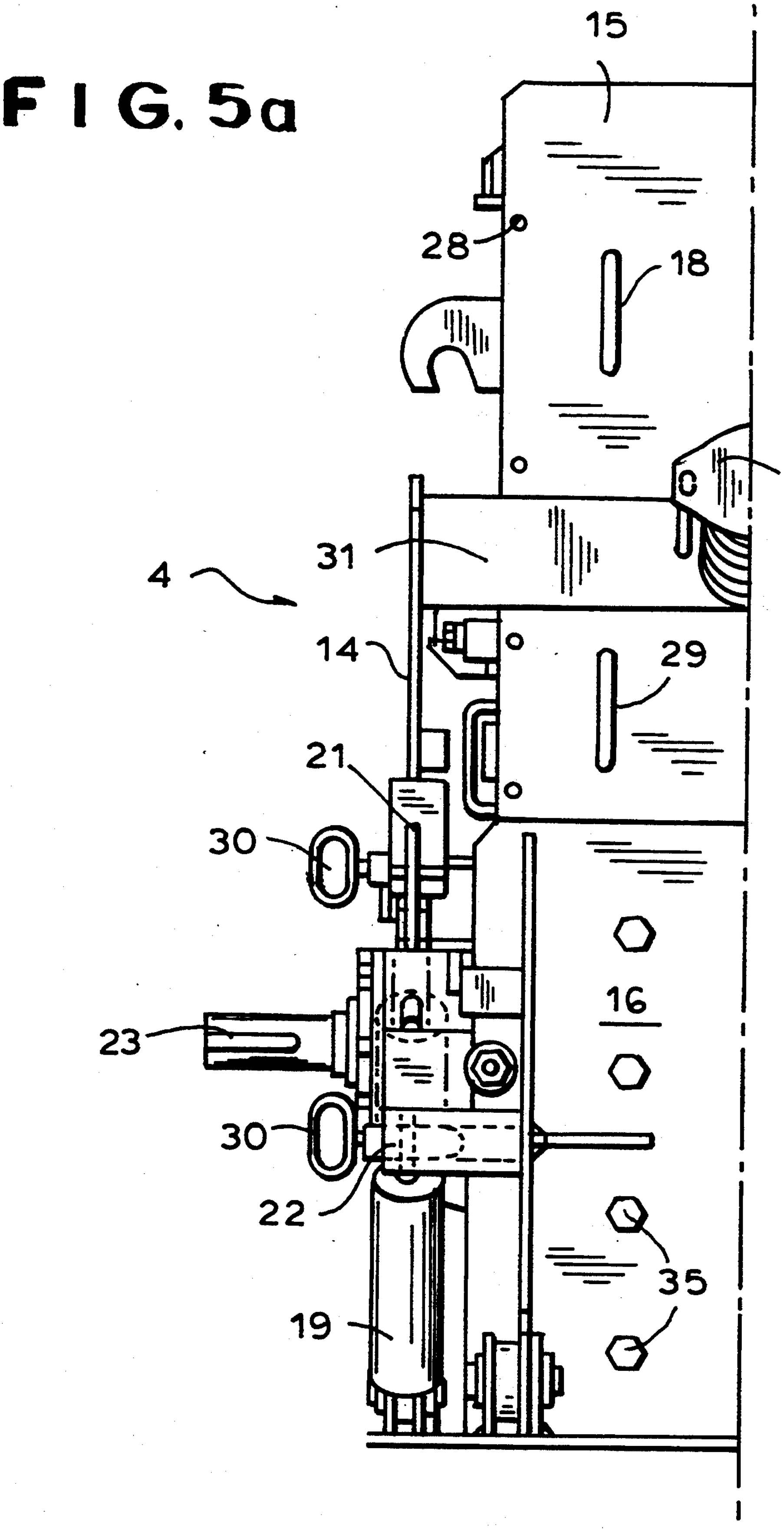
FIGS. 5*a* and *b* are partial views of the impact crusher according to FIGS. 1 and 3 from the front and from the rear, respectively.
Figure 5B:
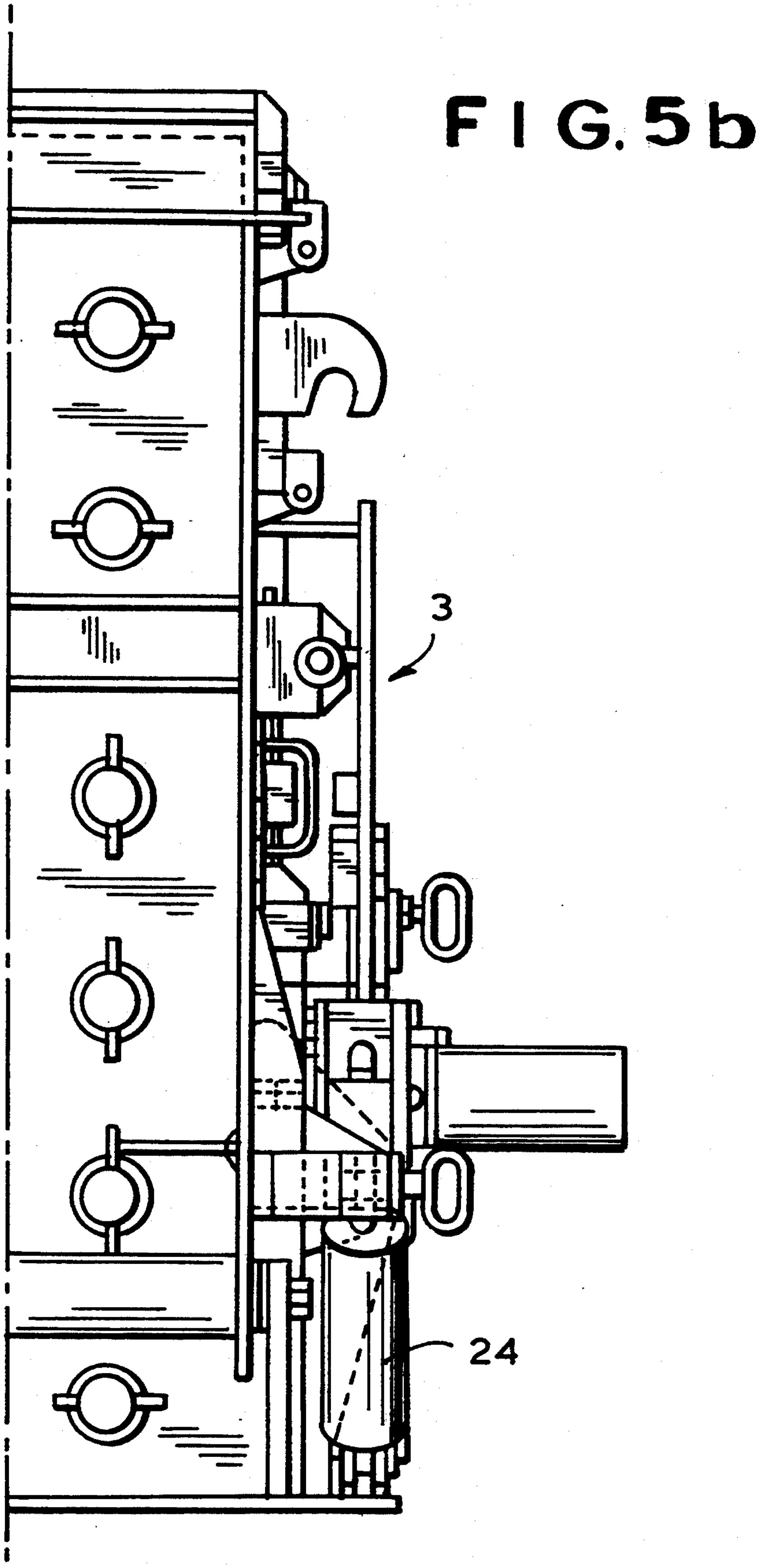

FIGS. 5*a* and 5*b* illustrate on the one hand a partial view of the rear section 4 and on the other hand a partial view of the front section 3. The upper part of the rear wall is formed by the flap 18 already indicated in FIG. 2, which in this example can swing around a not illustrated vertical axis, and which after the opening of same frees the access to the fastening elements of the impact mechanism which is not further illustrated here. The flap 18 is fastened to the housing 2 by screws 28, since the upper rocker arm part, when the impact mechanism has been moved in, is moved into the housing 2 together with the impact mechanism. Furthermore illustrated is the lower rocker arm part 14, which in the moved-in position of the impact mechanism remains outside the housing 2. In the area of the lower rocker arm 14 a further flap 29 is provided which is screwed to the housing 2, and after removing same access is obtained to further fastening elements of the impact mechanism. Also shown is the further part 16 with fastening elements 35 for the impact bodies 17 (FIG. 1) as well as the drive shaft 23 of the rotor. The one side of the hydraulic cylinder can in this case be mounted optionally on the coupling point 22 of the further part 16 or on the coupling point 21 of the lower rocker arm part 14. To this end the securing elements 30—only indicated here—need only be changed over. In the transition part of the lower rocker arm 14 to the upper rocker arm 13 a wall section 31 is provided which joins the two rockers arms 13, 14 to one another, which wall section 31 on the one hand forms a further part of the rear wall 15 and on the other hand holds the adjusting device 12 which is only indicated here. The hydraulic cylinder 24 serves to open the front housing section 13, as already discussed. The impact bodies provided inside the housing 2 and not further illustrated here are prevented from falling out by means of securing elements 32.

Figure 6:
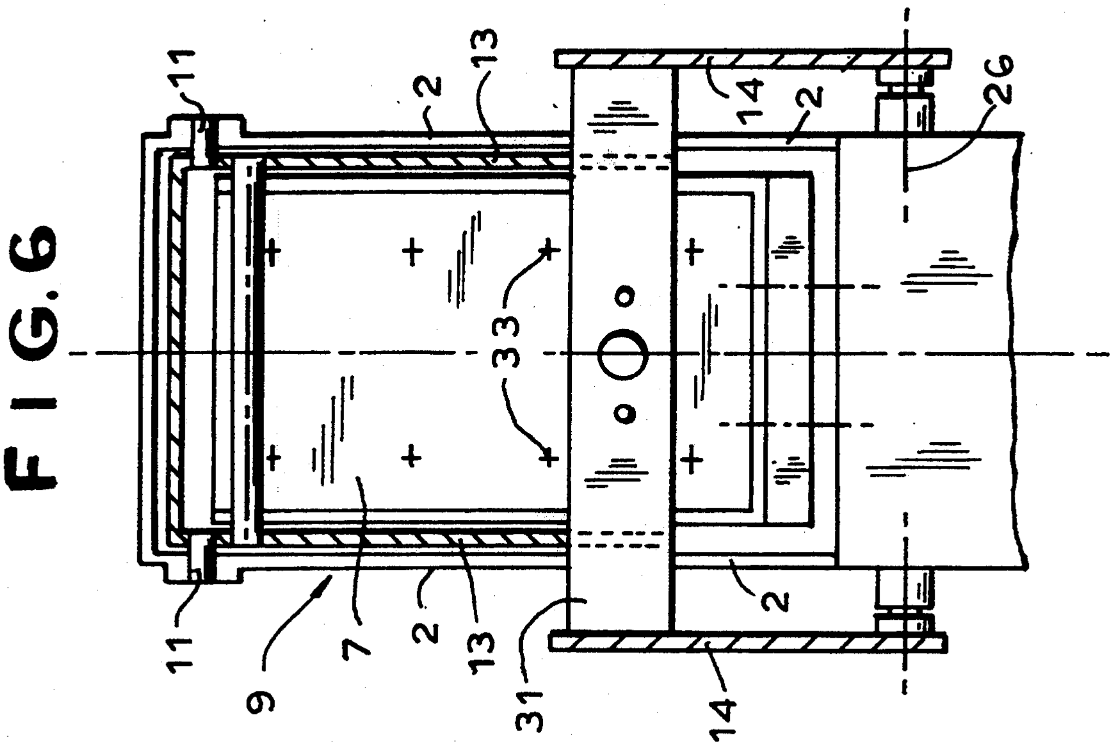
FIG. 6 is a fragementary sectional view of the rear housing section (with rocker arm) of an impact crusher according to the FIGS. 1 and 3.

FIG. 6 shows in diagrammatic form once again a partial view of the frame 9 with the two lower rocker arm parts 14 as well as the upper rocker arm parts 13 in conjunction with the wall section 31 which joins together the transition parts of the rocker arms 13 and 14. Also indicated is the horizontal axis 26, around which the bottom rocker arm part 14 can be swung in relation to the housing 2. The impact mechanism 7 mounted in the upper rocker arm part 13 is only indicated here, the impact elements being prevented from falling out by securing elements 33 indicated by crosses. The horizontal axis 10, which serves to swing the impact mechanism 7, extends here in the upper part of the rocker arms 13. Also shown is the securing in the form of bolts 11 between the upper rocker arm parts 13 and the housing 2.

I claim:

1. A method of exchanging impact elements of an impact crusher comprising the steps of:
  (a) mounting impact elements of an impact crusher on a frame swingable relative to a housing containing a rotor having crushing elements so that said impact elements are juxtaposed with said rotor in a working position of said frame;
  (b) swinging said frame out of said housing into a substantially horizontal position, thereby rendering said impact elements accessible;
  (c) turning over said impact elements while said frame is swung out of said housing; and
  (d) swinging said frame back into said housing so that said impact elements are again juxtaposed with said rotor in said working position and securing said frame in said working position relative to said housing.

2. An impact crusher, comprising:
  a housing;
  a rotor mounted in said housing and provided with crushing elements projecting from said rotor; and
  at least one impact mechanism cooperating with said crushing elements, said impact mechanism comprising:
    a plurality of impact elements juxtaposed with said rotor and cooperating with said crushing elements,
    a frame independent of said housing receiving said impact elements, and
    means for swingably mounting said frame for movement independently of said housing from a working position wherein said impact elements are juxtaposed with said rotor into a position wherein said frame and said impact elements lie outside said housing.

3. The impact crusher defined in claim 2 wherein said frame is swingable about a horizontal axis and said means for swingably mounting said frame is constructed and arranged to swing said frame and said impact elements into a generally horizontal position.

4. The impact crusher defined in claim 3 wherein said means for swingably mounting said frame include lateral rocker arms, said impact elements being connected to said frame at least at one side thereof.

5. The impact crusher defined in claim 4 wherein said rocker arms are divided into upper rocker arm parts and lower rocker arm parts, said impact elements being connected to said upper rocker arm parts and said lower rocker arm parts being swingable relative to said housing.

6. The impact crusher defined in claim 5 wherein said rocker arm parts are swingable into said housing while said lower rocker arm parts remain outside said housing in said working position of said impact mechanism.

7. The impact crusher defined in claim 6 wherein said frame is formed with a flap forming a rear wall for said housing in said working position of said mechanism.

8. The impact crusher defined in claim 7 wherein said upper rocker arm parts carry an upper flap which can be secured to said housing and is swingable and said lower rocker arm parts carry a removable lower flap.

9. The impact crusher defined in claim 8, further comprising a wall section between said flaps interconnecting said upper and lower rocker arm parts.

10. The impact crusher defined in claim 9, further comprising an adjusting device mounted to said wall section and acting upon said mechanism to adjust a position of said impact elements relative to said rotor.

11. The impact crusher defined in claim 6 wherein in said working position at least said upper rocker arm parts are positioned to be locked to said housing by at least one bolt.

12. The impact crusher defined in claim 2 wherein a rear wall of said housing is provided with additional impact elements juxtaposed with said rotor, said rear wall being mounted for swinging said impact elements on said rear wall out of said housing as a further impact mechanism.

13. The impact crusher defined in claim 12 wherein said further impact mechanism is swingable about a horizontal axis at a lower end thereof and can be swung into a generally horizontal position.

14. The impact crusher defined in claim 13, further comprising a hydraulic cylinder selectively connectable to said one impact mechanism and said further impact mechanism for respectively swinging same into positions outside said housing.

15. The impact crusher defined in claim 14 wherein said cylinder is pivotally connected to said housing at one end and has an opposite end selectively connectable to a respective coupling point on each of said impact mechanisms.

16. The impact crusher defined in claim 14 wherein said further impact mechanism and said one impact mechanism have aligned recesses in a position wherein said first impact mechanism is swung outside said housing, a securing element passing through said aligned recesses to lock said impact mechanisms together.

17. The impact crusher defined in claim 16 wherein said securing element is a bolt locking said one impact mechanism in said working position.

* * * * *